US010987560B2

(12) United States Patent
Higgins et al.

(10) Patent No.: US 10,987,560 B2
(45) Date of Patent: Apr. 27, 2021

(54) SWING TRAINING DEVICE, SYSTEM AND METHOD

(71) Applicants: Mike Higgins, Coral Springs, FL (US); Jeannette Higgins, Coral Springs, FL (US)

(72) Inventors: Mike Higgins, Coral Springs, FL (US); Jeannette Higgins, Coral Springs, FL (US)

(*) Notice: Subject to any disclaimer, the term of this patent is extended or adjusted under 35 U.S.C. 154(b) by 0 days.

(21) Appl. No.: 15/929,396

(22) Filed: Apr. 30, 2020

(65) Prior Publication Data

US 2021/0008425 A1    Jan. 14, 2021

Related U.S. Application Data

(60) Provisional application No. 62/872,065, filed on Jul. 9, 2019.

(51) Int. Cl.
| | | |
|---|---|---|
| *A63B 69/36* | (2006.01) | |
| *A63B 69/00* | (2006.01) | |
| *G02B 5/00* | (2006.01) | |
| *A42B 3/22* | (2006.01) | |
| *A63B 102/18* | (2015.01) | |
| *A63B 69/38* | (2006.01) | |

(52) U.S. Cl.
CPC ............ *A63B 69/0002* (2013.01); *A42B 3/22* (2013.01); *G02B 5/005* (2013.01); *A63B 69/3608* (2013.01); *A63B 69/38* (2013.01); *A63B 2069/0008* (2013.01); *A63B 2102/182* (2015.10)

(58) Field of Classification Search
CPC ............ A63B 69/0002; A63B 69/3608; A63B 2102/182; A63B 69/38; A63B 2069/0008; A42B 3/22; G02B 5/005
USPC ................................................ 473/210, 458
See application file for complete search history.

(56) References Cited

U.S. PATENT DOCUMENTS

| | | | | |
|---|---|---|---|---|
| 4,063,740 A | * | 12/1977 | Mader ................ | A63B 69/3608 473/210 |
| 4,392,650 A | * | 7/1983 | Hilton .................... | A63B 69/38 473/210 |
| 4,852,882 A | * | 8/1989 | Otsuka ............... | A63B 69/3608 473/210 |
| 4,969,649 A | * | 11/1990 | Lugiewicz .......... | A63B 69/3608 473/210 |
| 5,413,346 A | * | 5/1995 | Hedlund ............ | A63B 69/3608 351/51 |
| 5,661,534 A | * | 8/1997 | Gill ........................ | A61F 9/045 2/12 |
| 6,390,619 B1 | * | 5/2002 | Gill, Jr. ............... | A63B 69/0002 2/12 |
| 8,296,869 B2 | * | 10/2012 | Kellogg ............... | A42B 3/0406 2/424 |

* cited by examiner

*Primary Examiner* — Nini F Legesse
(74) *Attorney, Agent, or Firm* — Dunlap Bennett & Ludwig, PLLC

(57) ABSTRACT

A swing training device is provided. The swing training device embodies a mask adapted to place an aperture at a predefined focal length in front of the eyes of the athlete. The mask is adapted to attach to various headgear. The mask provides guides for selectively retaining diaphragms with their own diaphragmatic apertures over the aperture.

10 Claims, 4 Drawing Sheets

SWING TRAINING DEVICE, SYSTEM AND METHOD

CROSS-REFERENCE TO RELATED APPLICATION

This application claims the benefit of priority of U.S. provisional application No. 62/872,065, filed 9 Jul. 2019, the contents of which are herein incorporated by reference.

BACKGROUND OF THE INVENTION

The present invention relates to athletic training devices and, more particularly, to a swing training device embodying a headgear attachment to reduce the field of view of the wearer, whereby the wearer self-teaches themselves to prevent head movement throughout an entire swing.

In the game of baseball or softball, restricting or eliminating head movement throughout the entire swing is essential for good fundamentals. Athletes of all ages struggle keeping their head still due to improper fundamentals and poor balance throughout the swinging phase, among other things.

Currently, baseball swing training devices focused on the batter's vision include eyewear too close to the user's pupils, often causing blurred or unclear vision (frustrating the overall purpose of improving one's baseball swing for the purpose of striking the ball).

As can be seen, there is a need for a swing training device embodying a headgear attachment to restrict the wearer's field of view which in turn coaches them to stop moving their head throughout an entire swing.

The attachment is a mask dimensioned and adapted to attach to headgear of the wearer, in certain embodiment engaging the bill of the headgear. The mask provides an aperture which limits the wearer's peripheral vision. Depending on the headgear, the distance (or focal length) between the front portion of the mask and the pupils of the wearer is approximately 3½ to 4 inches, allowing the wearer's eyes to adjust to the 3½ to 4 inch offset of the viewing aperture as opposed to eyewear offset only ½ inch away from the eyes of the wearer.

Looking through the aperture of the present invention not only allows the eyes to adjust but the athletes retains clear vision of the ball prior to contact at the swing because of the focal length between the pupils and the aperture. The present invention teaches the athletes to not move their head, else lose sight of the ball through the aperture. The aperture also blocks out peripheral vision, further forcing the athlete to focus on the ball looking through a small aperture in the mask attached to the headgear.

SUMMARY OF THE INVENTION

In one aspect of the present invention, a training device includes the following: a mask maintaining an aperture therein at a predefined focal length in front of the eyes of a wearer of the mask, wherein the predefined focal length is between three to four and a half inches in length.

In another aspect of the present invention, the training device further include a temple portion extending from each end of the mask toward an ear of said wearer; wherein the aperture has a length between three and four inches and a height between one and two inches; an earpiece attachment at a distal end of each temple, each earpiece attachment adapted to attach near the ear of said wearer; a central tab provided along an upper periphery of the mask upward of the aperture; a rim rest provided along the upper periphery of the mask at or adjacent to an interface of the mask and each temple portion; each rim rest and the central tab dimensioned to engage a bill of a headgear of the wearer; one or more diaphragms dimensioned to cover the aperture, wherein each diaphragm provides a diaphragmatic aperture; and a diaphragm guide on opposing sides of the aperture, each diaphragm guide engages a periphery of one of the one or more diaphragms.

In yet another aspect of the present invention, a method of teaching a swing includes the following: providing the above-mentioned training device of claim; wearing a headgear; and engaging the training device and the headgear so that the aperture is maintained at said predefined focal length; and then inserting one of the one or more diaphragms over the aperture.

In yet another aspect of the present invention, a training system includes the following: a mask having an aperture therein; a headgear; and one or more connectors provided along an upper periphery of the mask for engaging the headgear so that the aperture is maintained at a predefined focal length in front of the eyes of a wearer of the headgear, wherein the predefined focal length is between three to four and a half inches in length.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a swing training device embodied in a mask adapted to place an aperture at a predefined focal length in front of the eyes of the athlete. The mask is adapted to attach to various headgear. The mask provides guides for selectively retaining diaphragms with their own diaphragmatic apertures over the aperture.

Referring to FIGS. 1 through 8, the present invention may include a mask 10 and 24 dimensioned and adapted to engage a headgear 12 for disposing an aperture 14 provided in a front portion 11 of the mask at a focal length of three to four and a half inches from a wearer's eyes. The headgear 12 may be a batting helmet, lacrosse helmet, or other sports helmet, as well as other headwear, including hats or visors (e.g., a golf visor). Thereby, in any sport or activity requiring focus on an object or ball, and concerted hand-eye coordination, the present invention can be utilized to improve such focus and/or hand-eye coordination.

Figure 1:
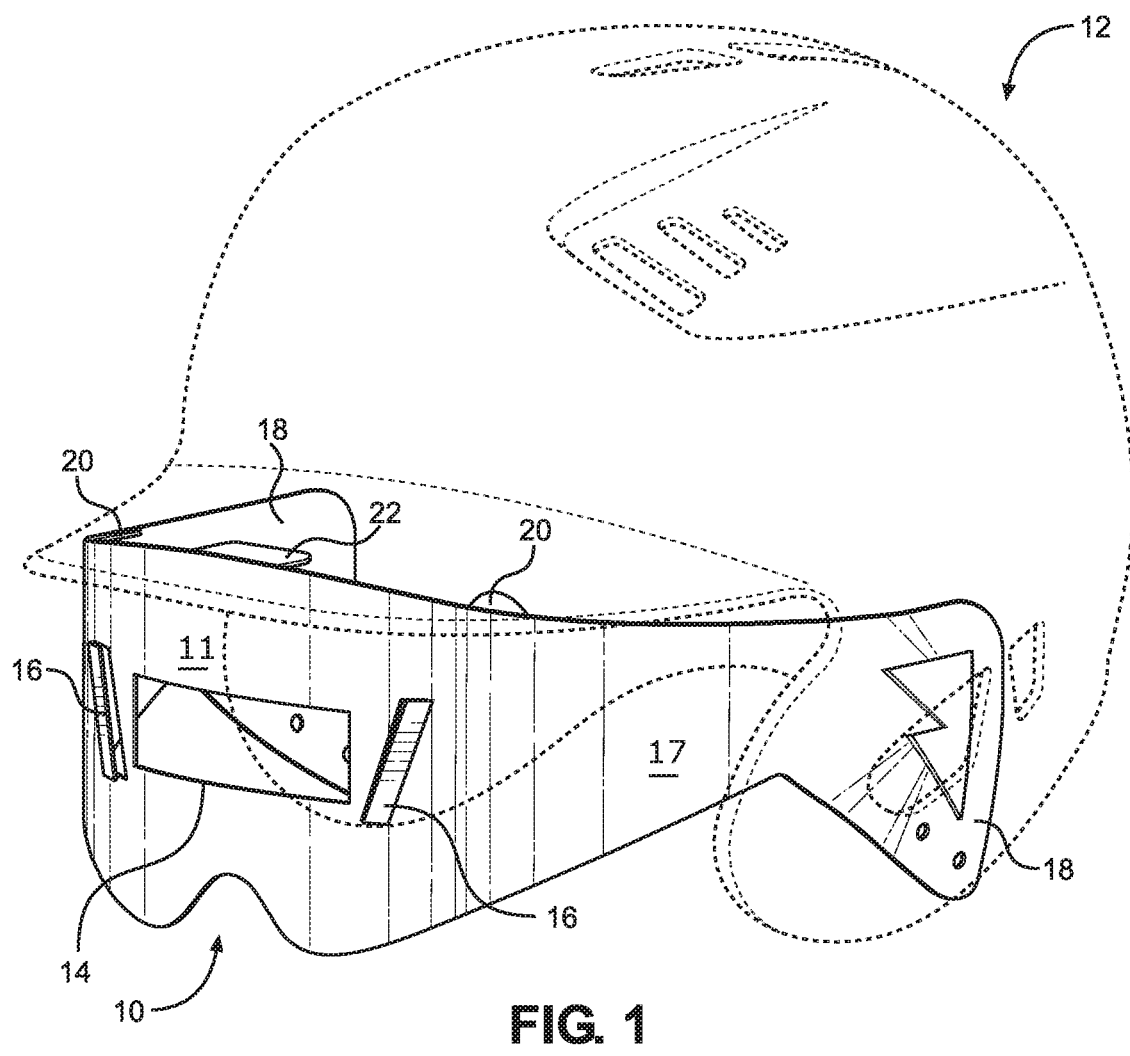
FIG. 1 is a front perspective view of an exemplary embodiment of the present invention shown in use.

It should be understood by those skilled in the art that the use of directional terms such as upper, lower, upward, downward, inward and outward and the like are used in relation to the illustrative embodiments as they are depicted in the figures; specifically, the upward direction (or upper) being toward the top of the corresponding figures, and other directions being in reference to the corresponding figures relative to a wearer of the headgear associated with the present invention, as illustrated in FIG. 1.

The mask 10 or 24 may have a front portion 11 dimensioned to shield the eyes of a wearer while accommodating the nose of the wearer. The mask 10 and 24 may provide a temple portion 17 extending transversely from each ends of the front portion 11, each temple portion 17 extending toward an ear of the wearer of the headgear 12. The front portion 11 may be opaque or translucent.

Figure 2:
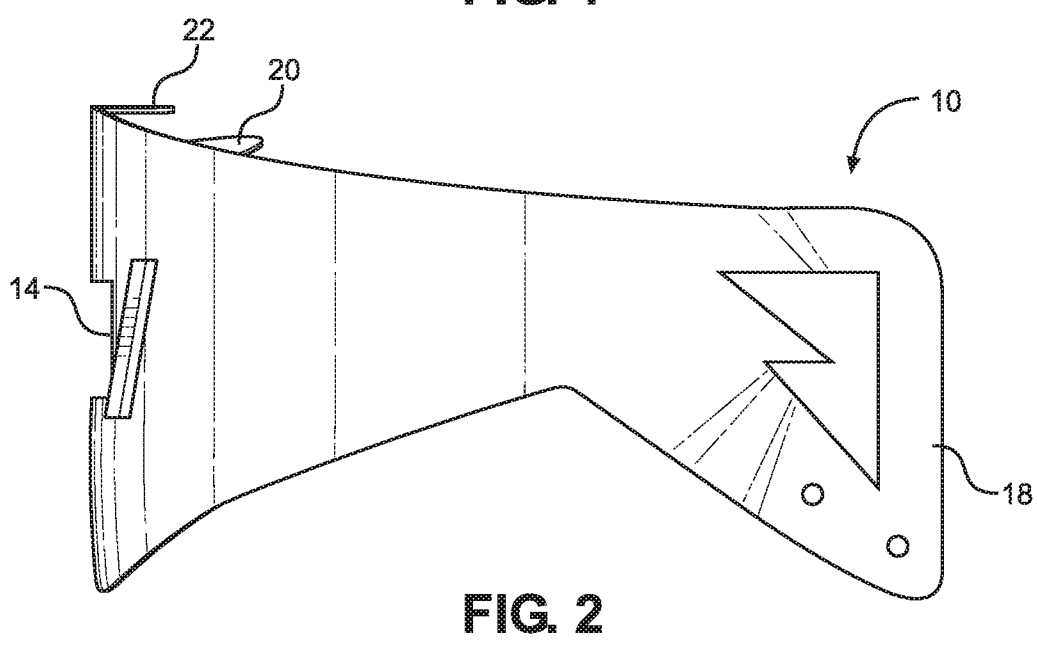
FIG. 2 is a side elevation view of an exemplary embodiment of the present invention.
Figure 6:
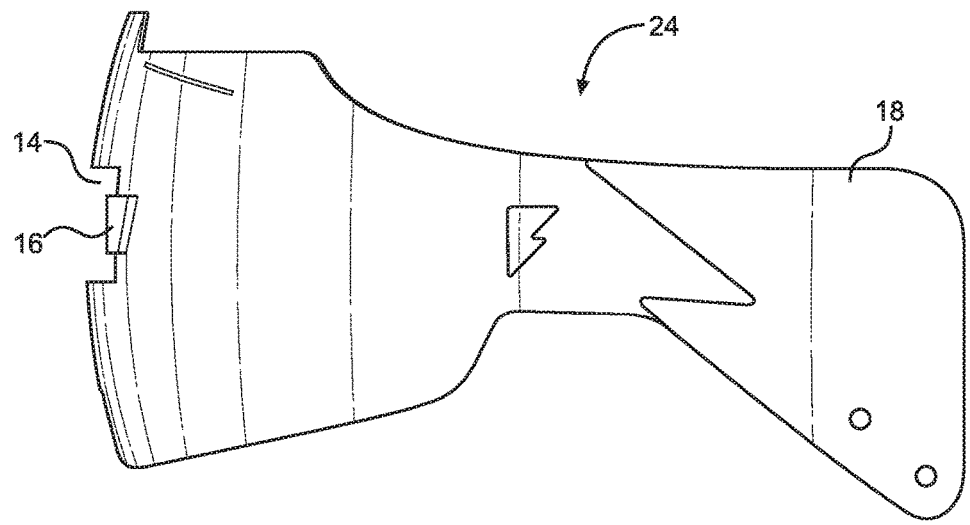
FIG. 6 is a side elevation view of another embodiment of the present invention.
Figure 7:
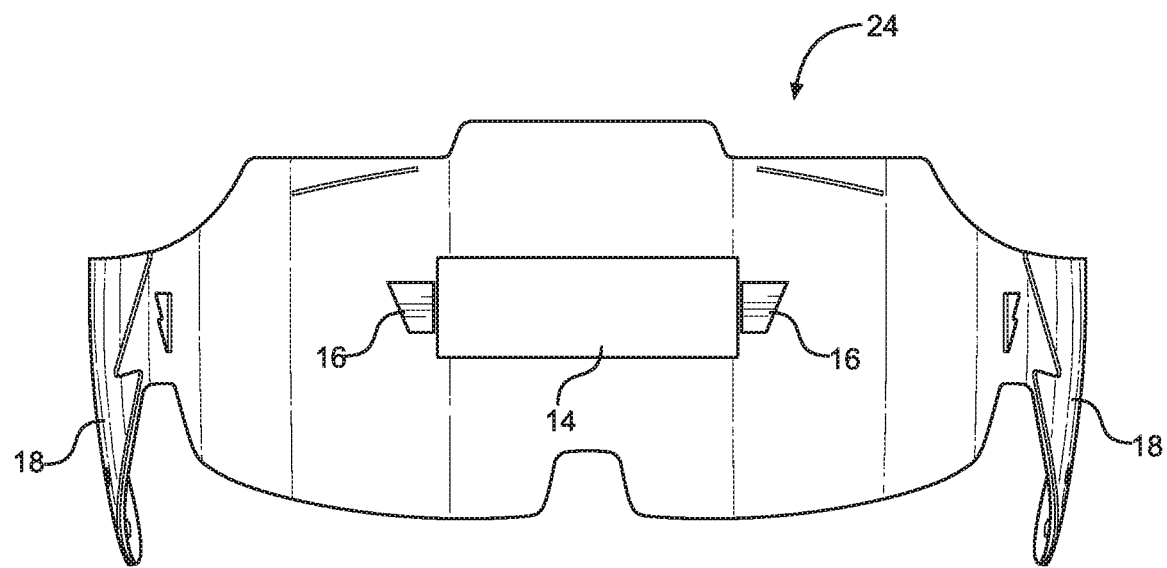
FIG. 7 is a front elevation view of another exemplary embodiment of the present invention.
Figure 8:
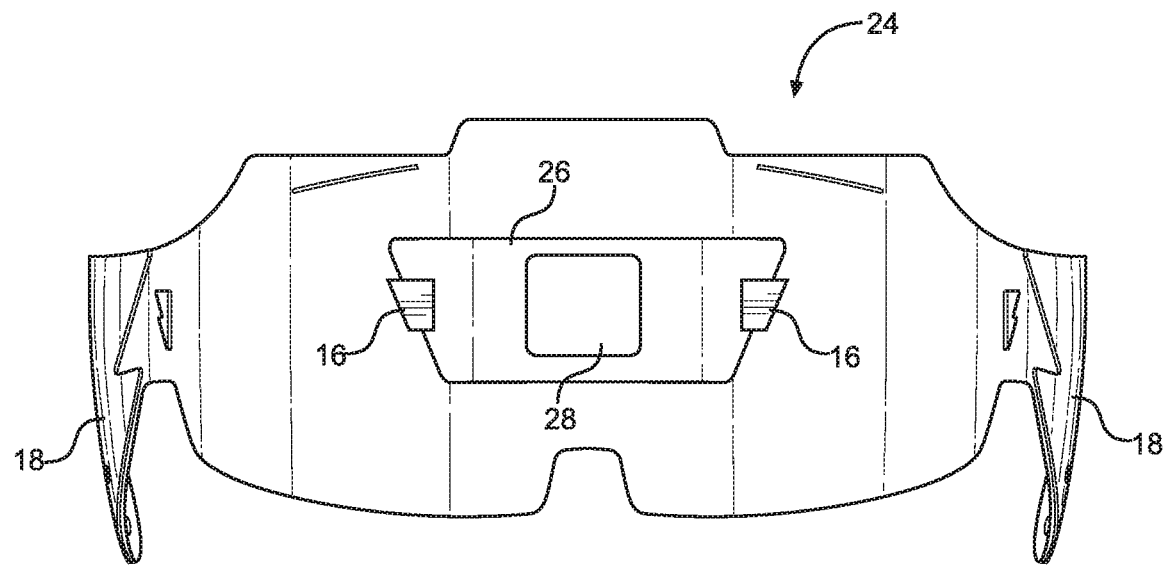
FIG. 8 is a front elevation view of an exemplary embodiment of the present invention, shown with the optional inserts attached.

Each mask 10 and 24 may provide an earpiece attachment area 18—for snapping on to the headgear 12—adjacent the distal ends of each temple portion 17. The earpiece attachment area 18 may be a void, as illustrated in FIG. 2 or could be additional structure, as illustrated in FIG. 6. Moreover, each mask 10 or 24 may provide a rim rest 20 along an upper periphery thereof adjacent to or near the interface of the front portion 11 and the temple portion 17. Furthermore, a center tab 22 may be disposed along an upper periphery, midpoint, of the front portion 11. The center tab 22 and the rim rests 20 are dimensioned and adapted to removably engage the headgear 12. Two connector clips on each side of the mask 10 or 24 may be provided, the first clip may be used to fit small size helmets, while the second clip may be used for sizing medium and large size helmets.

Specifically, on every youth helmet is the clip just below the ear hole. This clip is put on the helmet so kids can wear a chin strap so when they run the helmet doesn't fly off their head. The earpiece attachment area 18 engages said clip, enabling the mask 10 or 24 to retro fit headgear 12/helmets of all sizes by swapping out the earpiece attachment area 18 for the chin strap used for specific drills. Thus, when the athlete is done with the drill, they can unclip the earpiece attachment area 18 and continue to wear the helmet as is. Generally, the present invention is not to be used in live batting practice do to the limited vision and it is not designed for the safety issues involved in the shielding the face of the wearer from a hard missile traveling at 70 miles per hour or more.

To make sure the mask 10 or 24 fits all sizes, the center tab 22 and the rim rests 20 are dimensioned and adapted to engage the bill of the headgear 12/helmet in an upright position in such a way so that the aperture 14 does not slide below eye level. The tabs 22 and rim rests 20 may be above the bill of the helmet so as to catch the bill of the helmet when the mask 10 or 24 is attached to each side of the headgear 12/helmet. In certain embodiments, the tabs 22 may be above the bill, while rim rest 20 is below the bill (or vice versa)—the tabs 22 and rim rest 20 being generally coplanar—whereby a pinching force is engendered between the rest 20 and tabs 22, keeping the mask 10 or 24 at a fixed elevation relative to said bill/headgear 12, with limited movement upwards. As a result, if a coach wants to speak with an athlete, he or she will have the ability to push the headgear 12 (and the operatively associated mask 10 or 24) in an upwards position and see the coach. After they speak, the athlete lowers the headgear 12 (and the operatively associated mask 10 or 24), possibly by the bill of the headgear 12/helmet, and resumes with his or her drill.

The earpiece attachment area 18 may enable pivotable movement relative to the headgear 12 or otherwise move up and down so the coach can talk to the athlete during practice. Alternatively, a rubber band or hook-loop fastener can be utilized attach the mask 10 or 24 to the headwear 12 so that the front portion is at the predefined focal length from the wearer's eyes.

An aperture 14 is provided by the mask 10 or 24. The aperture 14 may be rectangular in shape, though it should be understood that although the aperture 14 is shown as rectangular, other shapes are possible, such as square, oval, as well as shapes that vary along their length. In certain embodiments, the aperture 14 may be three in length inches by one inch in width/height.

Figure 3:
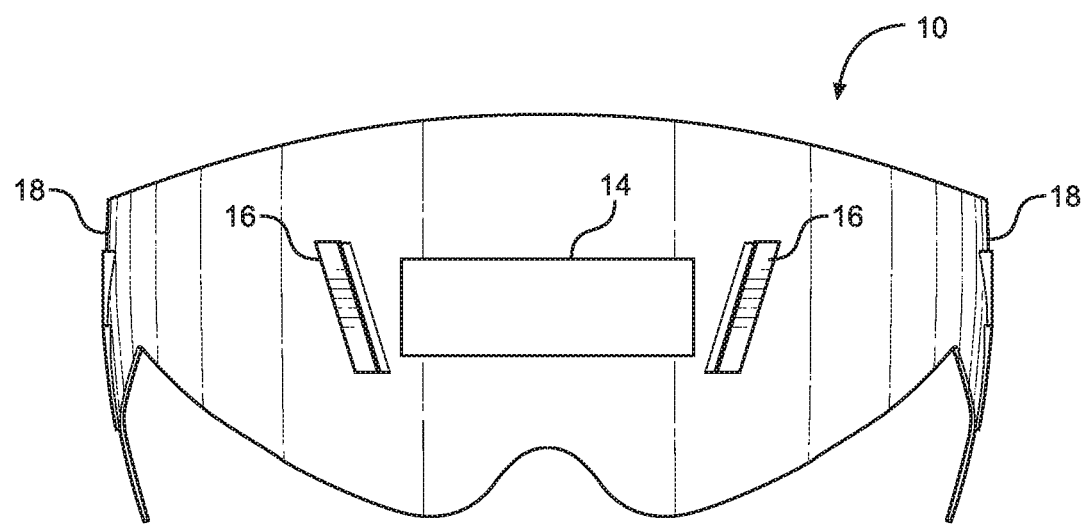
FIG. 3 is a front elevation view of an exemplary embodiment of the present invention.
Figure 4:
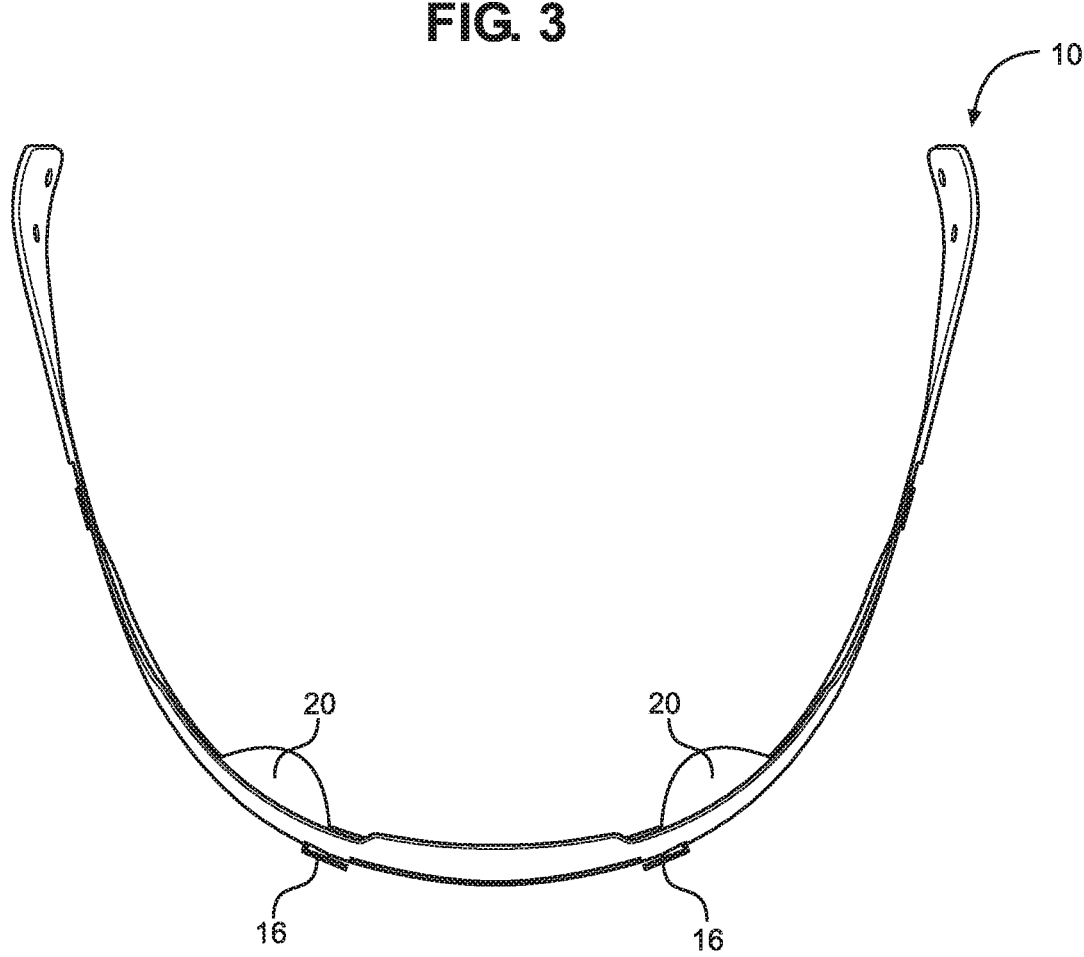
FIG. 4 is a top plan view of an exemplary embodiment of the present invention.
Figure 5:
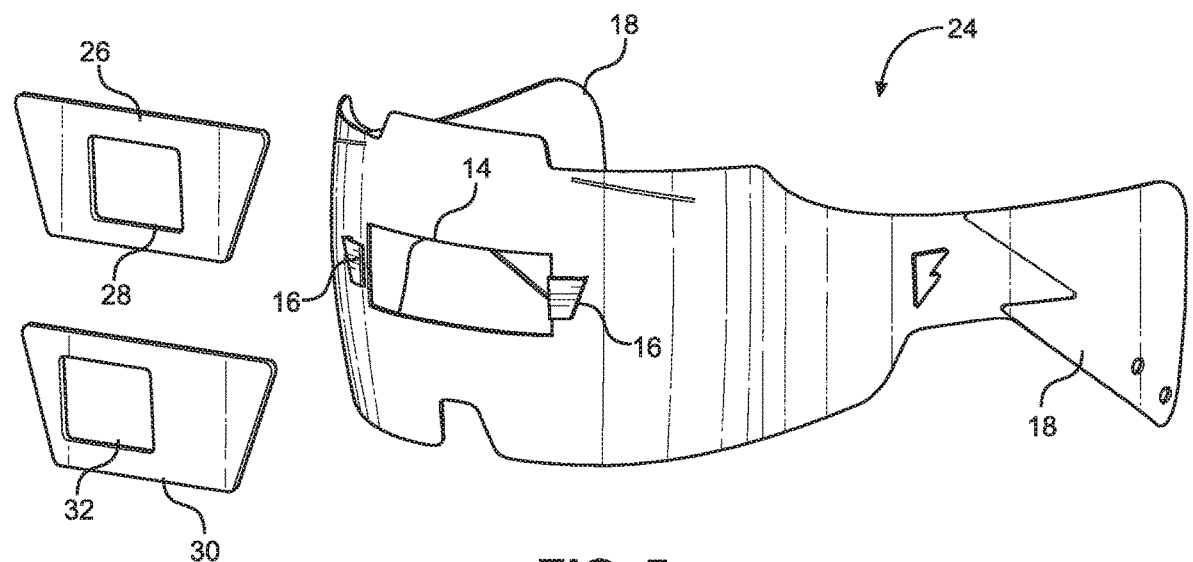
FIG. 5 is a front perspective view of another exemplary embodiment of the present invention shown in use, illustrating optional inserts.

A diaphragm retainer 16 may be removably attached to or adjacent either side of the aperture 14. Each diaphragm retainer 16 may have a width at least as long as the width of the aperture 14. Each diaphragm retainer 16 may be disposed at an angle relative to vertical (when the mask 10 or 24 is being worn, as illustrated in FIG. 3). The diaphragm retainer 16 functions to selectively retain one of a plurality of diaphragms 26 and 30 over or across the aperture 14. The diaphragm retainer 16 may provide guides or slots for accomplishing this, though other ways of attaching one object to another object may be utilized.

Each diaphragm 26 or 30 provides an associated diaphragmic aperture 28 or 32, respectively. Some diaphragmic apertures 28 may be centrally disposed while other are offset 32, relative to the main aperture 14. The diaphragmic apertures 28 or 30 narrow the focus or field of view of the wearer, which may be helpful during training, without having to change masks 10 or 24. For example, if an athlete starts with underhand pitched balls without a diaphragm 26 or 30, but then moves to doing tee drills, they do not have to find and attach a new mask 10 or 24.

In certain embodiments, along a periphery of the aperture 14 an image and/or video capture device may be attached. Such a device can export the images and videos to a computing device, such as a user's smart device for playing back and learning from.

The present invention was developed to teach proper fundamentals of a swing in the game of baseball, softball, golf, tennis or any other sport where muscle memory and hand eye coordination is important. Attaching the mask 10 or 24 by the way of the clips, the tabs 22, the rim rests 20 and/or the earpiece attachment areas 18 to the appropriate headgear 12 enables the front portion 11 to attach to and possibly move up or down over the bill of the headgear 12. When the mask 10 or 24 is in the down position the aperture 14 may be located in front of and the wearer's field of view. The aperture 14 narrows the field of view creating tunnel vision so that if the athlete takes his or her eyes off the ball they will lose complete sight of it. For baseball, the object is to learn to swing and keep one's head completely still throughout the entire swing.

In certain embodiments, the aperture 14 and thus the field of vision is only three inches wide and has the ability to narrow to one inch or less by removably associating one of a plurality of diaphragms 26 and 30 over the main aperture 14. In certain embodiments, the length of the aperture 14 may be between a range of one and a half to six inches. The width/height of the aperture 14 may be between a range of one and a half to four inches.

A method of using the present invention may include the following. The mask 10 and 24 disclosed above may be provided. During the swing, if the athlete moves his or her head slightly they will lose sight of the ball. The goal is to self-teach the athlete the perfect swing without moving their head throughout the entire swing. A user may attach the mask 10 or 24 to their headgear 12 wherein the front portion 11 is designed to block out peripheral vision only allowing a limited field of view through the aperture 14 to view the ball or object. Due to such a limited amount of space to look through the athlete must keep his or her head completely still throughout the entire action. The optional elements are the diaphragms 26 and 30 that slide into the mask to reduce the vision for more advanced athletes.

When using the present invention, the athlete should realize he was moving his head simply because once his head moves, he would not see the ball due to the limited field of vision. By using this training tool, the player would eventually develop his or her swing building muscle memory which will help him or her to become a more consistent hitter. For more advanced players they can put in the diaphragmatic inserts that will further reduce their vision as a hitter. When a player can master hitting the ball with no head movement, he or she will reach their potential.

Another example how this could be used is in the game of golf. A golfer practicing hitting golf balls at the range can use the shield attaching to the hat. The concept is the same in that if the golfer moves their head anytime throughout the swing they will be unable to see the ball due to the limited vision. When the golfer learns the proper mechanics of the swing, they will become a much better player.

It should be understood, of course, that the foregoing relates to exemplary embodiments of the invention and that modifications may be made without departing from the spirit and scope of the invention as set forth in the following claims.

What is claimed is:

1. A training device, comprising:
   a mask maintaining an aperture therein at a predefined focal length in front of the eyes of a wearer of the mask, wherein the predefined focal length is between three to four and a half inches in length;
   a diaphragm guide on opposing sides of the aperture, each diaphragm guide has a slot interchangeably connecting to a periphery of one of the one or more diaphragms; and
   one or more diaphragms dimensioned to cover the aperture, wherein one of the one or more diaphragms provides a diaphragmatic aperture offset from said periphery.

2. The training device of claim 1, further comprising:
   a temple portion extending from each end of the mask toward an ear of said wearer.

3. The training device of claim 2, further comprising:
   an earpiece attachment at a distal end of each temple, each earpiece attachment adapted to attach near the ear of said wearer.

4. The training device of claim 1, further comprising:
   a central tab provided along an upper periphery of the mask upward of the aperture.

5. The training device of claim 4, further comprising:
   a rim rest provided along the upper periphery of the mask at or adjacent to an interface of the mask and each temple portion, wherein each rim rest slopes downward toward the temple portion, respectively.

6. The training device of claim 4, further comprising:
   each rim rest and the central tab dimensioned to engage a bill of a headgear of the wearer.

7. The training device of claim 1, wherein the aperture has a length between three and four inches and a height between one and two inches.

8. A method of teaching a swing, comprising:
   providing the training device of claim 1;
   wearing a headgear; and
   engaging the training device and the headgear so that the aperture maintained at said predefined focal length.

9. The method of claim 8, further comprising:
   inserting one of the one or more diaphragms over the aperture.

10. The training device of claim 1, wherein said periphery and each diaphragm guide comprises respective angles relative to a vertical.

* * * * *